May 8, 1934.  A. E. WILKOFF  1,958,377
BRAKE TESTING APPARATUS
Filed April 30, 1931
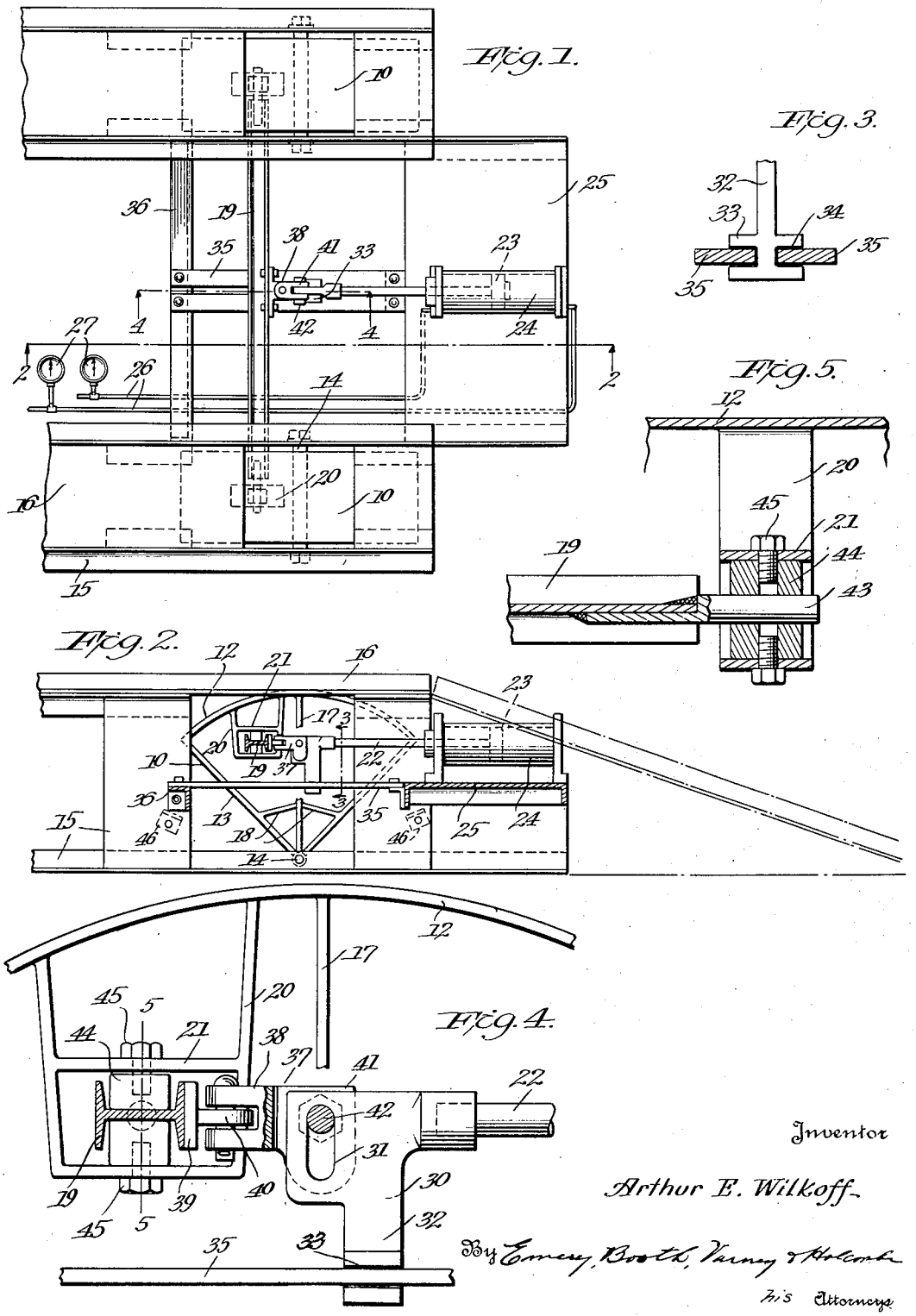
Inventor
Arthur E. Wilkoff
By Emery, Booth, Varney & Holcomb
his Attorneys Patented May 8, 1934

1,958,377

UNITED STATES PATENT OFFICE 1,958,377

BRAKE TESTING APPARATUS

Arthur E. Wilkoff, Niles, Ohio, assignor to Youngstown Steel Car Corporation, a corporation of Ohio Application April 30, 1931, Serial No. 534,115

13 Claims. (Cl. 265—47)

The present invention relates to improved apparatus for testing the brakes of motor vehicles and aims generally to improve existing apparatus for this purpose.

More specifically the invention relates to improvements in that type of apparatus wherein the power means, as for example, a reciprocatory actuator such as a fluid pressure piston, may be connected through an equalizer bar to the opposite wheel supports to simultaneously operate them to turn each on a pair of wheels against the resistance of its brake. Although the invention in many of its aspects has application of other forms of brake testing apparatus, it is particularly useful in connection with the types of apparatus shown and disclosed in my copending application Serial No. 462,071, filed June 18, 1930.

Illustrative of my invention reference may be had to a preferred embodiment thereof as shown in the accompanying drawing, wherein Fig. 1 is a sectional plan view of a portion of a brake testing apparatus embodying the improved features of my invention;

Fig. 2 is a longitudinal sectional view on the line 2—2 of Fig. 1;

Fig. 3 is a transverse section on line 3—3 of Fig. 2;

Fig. 4 is an enlarged longitudinal sectional view taken on the line 4—4 of Fig. 1; and Fig. 5 is an enlarged detailed sectional view taken on the line 5—5 of Fig. 4.

The particular type of brake testing apparatus illustrated herein includes a pair of wheel supporting members 10 which may advantageously be in the form of sectors comprising an arcuate wheel supporting surface 12 and angularly inclined ends 13 tapering from the ends of the wheel supporting surface to a point of pivotal support, as for example, an axle 14 carried in the framework 15 of the brake tester. The framework preferably includes a lower angle bar 15a and an upper runway 16 over which the vehicle may be moved in rolling the wheels upon the supports 10.

The wheel supports 10 as stated above are preferably sector shaped and include the arcuate wheel support surface 12, end plates 13 and central medial supporting rib 17 with lateral reinforcing ribs 18 welded or otherwise connected to the central rib 17 and ends 13.

The wheel supports 10 may be advantageously connected together for simultaneous movement by means of an equalizer member or bar 19 of suitable shape herein illustrated as comprising an I-section and may be suitably connected to the wheel supports as by universally connecting the ends thereof to hangers 20 depending from the underside of the wheel supporting surface 12 and located at one side, preferably forwardly of the central medial reinforcing rib 17. The hanger or bracket 20 may advantageously be of inverted A-shape having, as shown, a substantial U-shaped frame with a central bridge member 21 between the lower bight portion of the U and the wheel surface 12 between which bight portion and bridge the ends of the equalizer bar may be connected.

Movement of the equalizer bar and wheel supports 10 to move or partially rotate the wheels of the vehicle against the resistance of the brakes thereof may be effected by any suitable means, preferably a reciprocable actuator which may advantageously be in the form of a piston rod 22 of a piston 23 working in a pneumatic or other fluid pressure cylinder 24 which may advantageously be secured upon a supporting platform 25 bolted or otherwise secured to the side frames 15. Preferably the cylinder 24 is supported intermediate the laterally spaced frame members 15, and has air supply lines 26 leading to the opposite ends thereof which lines may be connected to gauges 27 to indicate the power applied to the piston 23 to move the wheels against the resistance of their brakes.

In order to accurately determine the brake resistance by measurement of the power applied to the actuator to move the wheels, it is important that the connections between the actuator and wheel supports be as free as possible, with little or no friction loss. In the specific embodiment of my invention illustrated herein, it is important that the outer end of the piston rod be guided to prevent friction loss due to sticking or binding of the piston within the cylinder toward the end of the outward stroke, while permitting relative vertical movement of the equalizer member as the rockers are swung forward and backward.

With this in view the outer end of the piston rod 22 carries a guide member 30, the head of which is provided with a vertically disposed slot 31, and depending arm 32 provided with a head 33. The sides of the head 33 may be grooved, as at 34 to receive guide bars 35 connected to the platform 25 and a transverse brace bar 36, and thus guide the outer end of the piston rod 22 in a horizontal plane during reciprocative movements thereof.

A universal coupling member 37 is provided for connecting the head 33 of the guide member 30 to the equalizer member, and may advantageously have a horizontally forked portion 38, pivotally connected as at 39 to a horizontally disposed tongue 40 on the equalizer bar 19, and a vertically forked portion 41 straddling the head 33 and carrying a pin 42 working in the slot 31 thereof. Thus the coupling member 37 provides a universal connection between the piston rod 22 or head 33 and the equalizer bar, permitting the free unrestrained application of power to the equalizer member throughout the entire movement thereof. By supporting and guiding the outer end of the piston rod 22 during its power stroke, loss of power applied to the piston 23 and transmitted to the equalizer member is minimized, so that the pressure readings on the gauge indicating the pressure applied in the cylinder will accurately correspond to the resistance offered by the brakes.

The opposite ends of the equalizer bar 19 may advantageously be loosely connected to the hangers, so as to tilt sufficiently to absorb any irregularity or misalignment of the equalizer bar, when the rockers are at opposite ends of their strokes. To accomplish this end, the equalizer bar 19 may be universally connected to the hanger, as for example, by having the ends of the bar 19 in the form of trunnions 43 either separate or integral therewith, and rotatably seated in castings 44 loosely bolted to the hangers by pins 45 extended through the bight portion of the U-shaped hanger and the bridge 21. Thus as the wheel supports or rockers 10 approach the ends of their strokes, which may advantageously be limited by stops 46, see Fig. 2, the equalizer bar may turn about the horizontal axis of the trunnions 43 to maintain alignment between castings 44 and the pin 42, while still permitting the application of power to the hanger 19 or rocker 10 substantially in a horizontal direction.

As viewed in Fig. 2, the parts of the testing apparatus are in their normal or inactive position, the rockers 10 being vertically disposed, and the piston 23 being intermediate the ends of the cylinder 24. As air is admitted to one end of the cylinder, for example, the left hand end as viewed in Fig. 2, the piston is moved to the right under a gradually increasing pressure which is indicated in the gauge 27. The coupling head 30 on the piston rod 22 likewise moves to the right in a uniform horizontal plane, being guided and supported by the head 33 and guide bars 35, so that binding and jamming of the piston in the cylinder is prevented. The force applied to the piston causes movement of the rockers to the right, the equalizer bar moving in an arcuate path about the axle 14 as a pivot. The equalizer bar is, however, universally connected to the hangers and has pivoted movement about a horizontal axis by reason of the trunnions 42 so that regardless of the arcuate movement of the equalizer bar, the application of power to the rockers is in a straight line by reason of the universal coupling 37. Hence a substantially frictionless universal coupling is provided between the horizontally movable piston rod 22 and the equalizer bar which moves in an arcuate path about the axle 14 as a pivot.

Thus the entire pressure of the compressed air or other motive force, as applied to the piston, is transmitted to move the supports which will not move the wheels against the resistance of its brakes until it equals such resistance. Hence the force required to move the wheels against the resistance of their brakes corresponds to the resistance of said brakes which may be conveniently and accurately measured on the gauges 27.

The advantages of my invention reside in its simplicity of construction and ease of operation which permits of accuracy of determining the resistance offered by the brakes of a motor vehicle. By guiding and supporting the piston rod against deflection during its reciprocation, winding of the piston in the cylinder and the piston rod in its stuffing box is largely avoided permitting substantially free unrestricted movement of the piston in the cylinder according to the pressure of the motive fluid applied thereto. As the piston moves toward one end of its stroke the equalizer bar connecting the wheel supports moves to a lower horizontal position due to the rocking of the wheel supports about their fixed pivotal axes. The universal coupling between the equalizer bar and the wheel supports permitting the equalizer bar to maintain its normal upright position regardless of the rocking movement of the supports as well as the slotted coupling between the equalizer bar and the piston rod permits of freer operation of these parts with a minimum frictional loss. The swivel mounting connecting the ends of the equalizer bar to the opposite wheel supports permits of a synchronizing movement of the supports under uniform brake resistance to the opposite wheels supported thereby, but permits of relative angular movement of the supports with relation to each other under conditions where the brake resistance offered upon the separate wheels is not uniform. Thus the mechanism provides a simple, convenient and accurate means permitting rapid operation of the opposite wheels of a motor vehicle to test the action of the brakes thereof either for forward or reverse direction of rotation of said wheels.

Having described a preferred embodiment of my invention what I claim as new is:

1. A brake testing apparatus including spaced arcuately movable wheel supports for supporting and simultaneously moving a pair of vehicle wheels against the resistance of the brakes thereof, an elongated equalizing lever connecting said supports for movement in unison, power means for moving said supports connected to said equalizing member intermediate the ends thereof, said connection including a universal coupling permitting free horizontal and vertical pivotal motion between said power means and equalizer member and means for measuring the power applied to move said supports.

2. A brake testing apparatus including spaced arcuately movable wheel supports for supporting and simultaneously moving a pair of vehicle wheels against the resistance of the brakes thereof, an elongated equalizing member connecting said supports for movement in unison, a reciprocating power actuator for moving said supports, a universal coupling connecting said actuator and equalizer member intermediate the ends thereof, means for supporting and guiding the actuator during reciprocation thereof, and means for measuring the power applied to said actuator to move said supports.

3. A brake testing apparatus comprising spaced wheel supports for supporting and moving a pair of vehicle wheels against the resistance of the brakes, said supports having arcuate wheel supporting surfaces and being rockable about a point of pivotal support, an equalizer lever pivotally connected to each support of said pair, power means for moving said supports, and means connecting said power means and equalizer member permitting unrestrained application of power to said equalizer member throughout the arcuate movement of said member about the point of pivotal support.

4. Brake testing apparatus as defined in claim 3 characterized by provision of a hanger on the wheel support at one side of the central vertical axis thereof to which the ends of the equalizer member are pivoted.

5. Brake testing apparatus as defined in claim 3 characterized by the power means being fluid pressure operated.

6. A brake testing apparatus comprising spaced wheel supports for supporting and moving a pair of vehicle wheels against the resistance of the brakes, said supports having arcuate wheel supporting surfaces and being rockable about a point of pivotal support, an equalizer member pivotally connected to each support of said pair, a reciprocable power actuator for moving said supports, and means connecting said power means and equalizer member permitting unrestrained application of power to said equalizer member throughout the arcuate movement of said member about the point of pivotal support.

7. Brake testing apparatus as defined in claim 6 characterized by the provision of means for guiding the power actuator.

8. Brake testing apparatus as defined in claim 6 characterized by the provision of means for supporting and guiding the power actuator for movement in a uniform horizontal plane while permitting relative vertical movement of the equalizing means.

9. A brake testing apparatus comprising spaced wheel supports for supporting and moving a pair of vertical wheels against the resistance of their brakes, said supports having arcuate wheel supporting surfaces and being movable about a point of pivotal support, an equalizing member connected to each of said supports of said pair, a fluid pressure operated cylinder positioned between said supports, a piston and piston rod assembly working within said cylinder, and means connecting said piston rod and equalizer member permitting unrestrained application of power to said equalizer member throughout the arcuate movement of said member about the point of pivotal support.

10. In a brake testing apparatus a plurality of wheel supports for supporting the wheels of a motor vehicle, each support comprising a sector shaped frame having an arcuate wheel supporting tread, and side members converging from the ends of said tread to a hub, a bracket member connected to the under side of said head, and at one side of the central plane of said support, and means connected to said bracket for moving said support against the resistance of the brake of the wheel supported thereby.

11. In a brake testing apparatus a plurality of wheel supports for supporting the wheels of a motor vehicle, each support comprising a sector shaped frame having an arcuate wheel supporting tread, and side members converging from the ends of said tread to a hub, a central reinforcing member between said tread and hub, a bracket member connected to the under side of said head, and at one side of the central plane of said support, and means connected to said bracket for moving said support against the resistance of the brake of the wheel supported thereby.

12. In a brake testing apparatus a plurality of wheel supports for supporting the wheels of a motor vehicle, each support comprising a sector shaped frame having an arcuate wheel supporting tread, and side members converging from the ends of said tread to a hub, a bracket member carried by the under side of said tread, a bearing block carried by said bracket and free to turn about a vertical axis, and means journalled in said bearing block to turn about a horizontal axis and means for moving said supports to rotate the supported wheel against the resistance of its brake.

13. In a brake testing apparatus, a supporting frame, a sector shaped wheel support pivotally mounted on said frame for rocking movement about a horizontal axis, a bracket member carried by said support above the pivotal axis thereof and at one side of the center of said support, a bearing member carried by said bracket, and means connected to said bearing member and free to turn therein about a horizontal axis for moving said support.

ARTHUR E. WILKOFF.